(12) United States Patent
Ju et al.

(10) Patent No.: US 8,343,674 B2
(45) Date of Patent: Jan. 1, 2013

(54) FUEL CELL SYSTEM AND CONTROL METHOD OF THE SAME

(75) Inventors: Ri-a Ju, Suwon-si (KR); Jin-hong An, Suwon-si (KR); Dong-rak Kim, Suwon-si (KR); Hyun Kim, Suwon-si (KR); Ho-jin Kweon, Suwon-si (KR); Young-jae Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1052 days.

(21) Appl. No.: 12/013,298

(22) Filed: Jan. 11, 2008

(65) Prior Publication Data

US 2008/0171240 A1    Jul. 17, 2008

(30) Foreign Application Priority Data

Jan. 17, 2007 (KR) .................... 10-2007-0005318

(51) Int. Cl.
*H01M 8/04* (2006.01)
(52) U.S. Cl. ........ 429/430; 429/428; 429/431; 429/432; 429/449
(58) Field of Classification Search .............. 429/414, 429/430, 431, 432, 442, 449, 454
See application file for complete search history.

(56) References Cited

U.S. PATENT DOCUMENTS

| | | | |
|---|---|---|---|
| 4,330,654 A | 5/1982 | Ezzell et al. | |
| 4,358,545 A | 11/1982 | Ezzell et al. | |
| 4,417,969 A | 11/1983 | Ezzell et al. | |
| 4,433,082 A | 2/1984 | Grot | |
| 4,610,762 A | 9/1986 | Birdwell | |
| 4,818,640 A | 4/1989 | Fukuda et al. | |
| 4,839,246 A | 6/1989 | Takabayashi | |
| 4,940,525 A | 7/1990 | Ezzell et al. | |
| 5,094,995 A | 3/1992 | Butt et al. | |
| 5,229,222 A | 7/1993 | Tsutsumi et al. | |
| 6,050,779 A | 4/2000 | Nagao et al. | |
| 6,254,748 B1 | 7/2001 | Surampudi et al. | |
| 6,268,077 B1 | 7/2001 | Kelley et al. | |

(Continued)

FOREIGN PATENT DOCUMENTS

EP    1065380    3/2001

(Continued)

OTHER PUBLICATIONS

Notice of Allowance from Corresponding Korean Patent Application 10-2007-0030973.

(Continued)

*Primary Examiner* — Ula C Ruddock
*Assistant Examiner* — Frank Chernow
(74) *Attorney, Agent, or Firm* — Knobbe, Martens, Olson & Bear, LLP

(57) ABSTRACT

A fuel cell system and a method for controlling the same corrects concentration sensing values by estimating temperature according to the load amount of a stack. A control method of a fuel cell system including the steps of: measuring the load amount of loads supplied with power from a stack; estimating temperatures at the area where a concentration sensor is installed from the load amount values; producing the corrected concentrations by correcting the concentration sensing values according to the estimated temperatures; and controlling the drive of the fuel cell system according to the corrected concentrations.

11 Claims, 2 Drawing Sheets

U.S. PATENT DOCUMENTS

| | | | |
|---|---|---|---|
| 6,410,180 B1 | 6/2002 | Cisar et al. | |
| 6,562,446 B1 | 5/2003 | Totsuka | |
| 6,836,123 B1 * | 12/2004 | Qi et al. | 324/446 |
| 6,916,573 B2 | 7/2005 | Trabold et al. | |
| 7,045,230 B2 | 5/2006 | Rusta-Sellehy et al. | |
| 2003/0165720 A1 | 9/2003 | Defilippis | |
| 2003/0215680 A1 | 11/2003 | Lillis et al. | |
| 2004/0197638 A1 | 10/2004 | McElrath et al. | |
| 2005/0069735 A1 | 3/2005 | George, II et al. | |
| 2005/0287402 A1 | 12/2005 | Maly et al. | |
| 2006/0216557 A1 * | 9/2006 | Miyamoto et al. | 429/22 |
| 2006/0234092 A1 * | 10/2006 | Thompson et al. | 429/13 |
| 2006/0269829 A1 | 11/2006 | Choi et al. | |
| 2006/0272943 A1 | 12/2006 | Chein et al. | |
| 2006/0280994 A1 | 12/2006 | Kim et al. | |
| 2006/0286425 A1 | 12/2006 | Nakato et al. | |
| 2007/0015014 A1 | 1/2007 | Kurosaki et al. | |
| 2007/0047929 A1 | 3/2007 | Hsieh | |
| 2007/0178343 A1 | 8/2007 | Muramatsu | |
| 2008/0063915 A1 | 3/2008 | Yamamoto | |
| 2008/0131747 A1 | 6/2008 | Park | |
| 2008/0199741 A1 | 8/2008 | Shin et al. | |
| 2008/0199758 A1 | 8/2008 | Shin et al. | |
| 2008/0241634 A1 | 10/2008 | An et al. | |
| 2009/0104489 A1 | 4/2009 | Shin et al. | |

FOREIGN PATENT DOCUMENTS

| | | |
|---|---|---|
| EP | 1239530 | 9/2002 |
| JP | 07-027056 | 1/1995 |
| JP | 07-182001 | 7/1995 |
| JP | 08-200216 | 8/1996 |
| JP | 10-284103 | 10/1998 |
| JP | 11-204121 | 7/1999 |
| JP | 2002-339872 | 11/2002 |
| JP | 2004-127671 | 4/2004 |
| JP | 2004-134326 | 4/2004 |
| JP | 2004-158355 | 6/2004 |
| JP | 2004-342480 | 12/2004 |
| JP | 2004-354210 | 12/2004 |
| JP | 2005-093143 | 4/2005 |
| JP | 2005-108850 | 4/2005 |
| JP | 2005-116333 | 4/2005 |
| JP | 2005-241507 | 9/2005 |
| JP | 2005-243618 | 9/2005 |
| JP | 2005-276602 | 10/2005 |
| JP | 2005-276697 | 10/2005 |
| JP | 2005-317437 | 11/2005 |
| JP | 2005-332736 | 12/2005 |
| JP | 2006-019106 | 1/2006 |
| JP | 2006-032135 | 2/2006 |
| JP | 2006-073235 | 3/2006 |
| JP | 2006-073312 | 3/2006 |
| JP | 2006-156295 | 6/2006 |
| JP | 2006-260966 | 9/2006 |
| JP | 2006-286321 | 10/2006 |
| JP | 2007-141457 | 6/2007 |
| KR | 930004841 | 6/1993 |
| KR | 10-0157488 | 7/1998 |
| KR | 10-2002-0074046 | 9/2002 |
| KR | 10-2003-0083511 | 10/2003 |
| KR | 10-2004-0017477 | 2/2004 |
| KR | 10-2004-0043499 | 5/2004 |
| KR | 10-2004-0092024 | 11/2004 |
| KR | 10-2005-0122769 A | 12/2005 |
| KR | 10-2006-0017599 | 2/2006 |
| KR | 10-2006-0018577 | 3/2006 |
| KR | 10-2006-0041912 | 5/2006 |
| KR | 10-2006-0083002 | 7/2006 |
| KR | 10-2006-0106284 | 10/2006 |
| KR | 10-2007-0042736 | 4/2007 |
| KR | 10-2007-0075712 | 7/2007 |
| KR | 10-2007-0095686 | 10/2007 |
| KR | 10-0776504 | 11/2007 |
| WO | WO 03090334 | 10/2003 |
| WO | WO 2005106994 | 11/2005 |
| WO | WO 2006027667 | 3/2006 |

OTHER PUBLICATIONS

Office Action for corresponding Korean Application No. 10-2007-0204600.

European Search Report from corresponding EP Application 08101591.9 1227/1962363, Jun. 12, 2009.

"Meeting the energy needs of future warriors", Committee on Soldier Power/Energy Systems Board on Army Science and Technology, Division on Engineering and Physical Sciences, National Research Council, 2004, p. 82-83.

U.S. Appl. No. 11/946,491, filed Nov. 28, 2007, Park et al., 2008-0131747, Office Action of May 4, 2010, Office Action of Dec. 2, 2009 and response.

U.S. Appl. No. 12/040,817, filed Feb. 29, 2008, Jin-hong An, 2008-0241634, Office Action of May 4, 2010, Final Office Action of Jan. 19, 2010 and response, Office Action of Jul. 9, 2009 and response, Restriction Requirement of Apr. 1, 2009 and response.

U.S. Appl. No. 11/956,180, filed Dec. 13, 2007, Shin et al., 2008-0199758, Final Office Action of Dec. 30, 2010 and response, Office Action of May 19, 2009 and response.

* cited by examiner

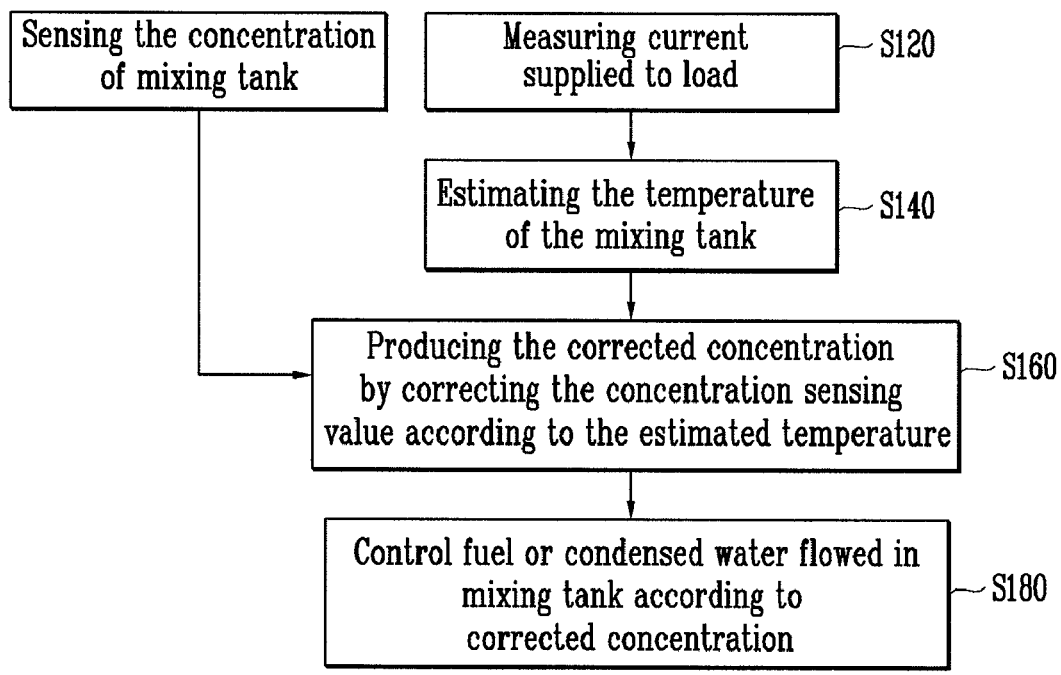

FUEL CELL SYSTEM AND CONTROL METHOD OF THE SAME

CROSS-REFERENCE TO RELATED APPLICATIONS

This application claims the benefit of Korean Patent Application No. 10-2007-0005318, filed on Jan. 17, 2007, in the Korean Intellectual Property Office, the disclosure of which is incorporated herein by reference.

BACKGROUND

1. Technical Field

The present disclosure relates generally to a fuel cell system using aqueous solution fuels, and more particularly to a fuel cell system and a method that corrects concentration sensing values by estimating temperature according to the load on a stack.

2. Discussion of Related Art

A fuel cell is a power generation system that generates electric energy by a balanced electrochemical reaction, for example, between oxygen in the air and hydrogen contained in hydrocarbon compounds and their derivatives such as methanol, ethanol, and natural gas, etc.

Fuel cells can be categorized into phosphoric acid fuel cells, molten carbonate fuel cells, solid oxide fuel cells, polymer electrolyte fuel cells, alkaline fuel cell, and the like, according to type of electrolyte used therein. These types of fuel cells operate on the basic same principle, but differ in view of types of fuels used, operating temperatures, catalysts, electrolytes, and the like.

Compared with other types of fuel cells, the polymer electrolyte membrane fuel cell (PEMFC) has advantages including high output, low operating temperature, and rapid starting and response characteristics, and is widely applicable as a transportable power source, such as for a portable electronic device, or as a mobile power source, such as a power source for automobile, as well as a distributed power source, such as a stationary power plant used in a house, a public building, and the like. The polymer electrolyte membrane fuel cell generates electricity by using gaseous fuel, typically, molecular hydrogen.

A direct methanol fuel cell (DMFC) is similar to the polymer electrolyte membrane fuel cell, but is capable of directly using liquid methanol as a fuel, generally, as an aqueous methanol solution. The direct methanol fuel cell is advantageous in view of miniaturization since it does not need a reformer to form hydrogen fuel in contrast to the polymer electrolyte membrane fuel cell.

A direct methanol fuel cell includes a stack, a fuel tank, and a fuel pump, for example. The stack generates electric energy by electrochemically reacting a hydrogen-containing fuel and an oxidant, such as oxygen and air, etc. Such a stack generally has a structure in which several or several tens of single fuel cells comprising a membrane electrode assembly (MEA) and a separator are stacked. Herein, the membrane electrode assembly has a structure in which an anode electrode (referred to as "fuel electrode" or "oxidation electrode") and a cathode electrode (referred to as "air electrode" or "reduction electrode") are adhered to each other, with a polymer electrolyte membrane disposed therebetween.

A fuel cell such as the direct methanol fuel cell in which the fuel to the stack is supplied as an aqueous solution exhibits great differences in operational efficiency according to the mole concentration of the fuel supplied to the anode and cathode electrodes. For example, if the mole concentration of the fuel supplied to the anode electrode is high, the amount of fuel transferred from the anode side to the cathode side increases due to limitations of currently available polymer electrolyte membranes. Therefore, a counter-electromotive force occurs due to the reacted fuel at the cathode electrode side thereby reducing output. Accordingly, the fuel cell stack has optimal operation efficiency at a predetermined fuel concentration according to its constitution and characteristics. As a result, a need exists for a method of properly controlling the mole concentration of fuel so as to achieve the stable operation of the direct methanol fuel cell system.

Therefore, the direct methanol fuel cell system and the like may include a means for measuring a concentration of solution stored in components such as a stack, a fuel tank, and a mixing tank, and/or a concentration of solution flowing in conduits between such components. In a fuel cell, a driving state of a fuel cell system can be estimated by measuring a concentration of fuel aqueous solution, etc., and each component of the fuel cell system is controlled according to the estimated result so that the operation efficiency of the fuel cell can be improved.

In order to satisfy the requirements described above, commonly used concentration sensors include polymer adsorption-type concentration sensors, ultrasonic-type concentration sensors comprising an ultrasonic generator and a detector, and resistance measurement-type concentration sensor, etc.

However, in currently widely employed concentration sensors, there are considerable deviations in the sensed values depending on the temperature of solution. Therefore, the temperature of solution at the sensed time point should be known in order to obtain accurate concentration. To this end, a dilution tank is provided with separate temperature sensors, which, however, increases manufacturing cost and volume.

SUMMARY OF THE INVENTION

Embodiments of this disclosure solve one or more of the problems. It is an object to provide a fuel cell system and a control method for the same capable of correcting concentration sensing values, without having a separate temperature sensor.

Also, it is another object to provide a fuel cell system and a control method for the same capable of ensuring a relatively accurate operation with low cost and small volume.

In order to accomplish the objects, there is provided a control method of a fuel cell system including the steps of: measuring the load amount of loads supplied with power from a stack; estimating temperatures at the area where a concentration sensor is installed from the load amount values; producing the corrected concentrations by correcting the concentration sensing values according to the estimated temperatures; and controlling the drive of the fuel cell system according to the corrected concentrations.

In order to accomplish the objects, there is provided a fuel cell system including: a stack generating power by electrochemically reacting hydrogen and oxygen; a concentration sensor measuring concentrations of aqueous solution supplied to the stack; a load amount measuring unit for measuring the load amount of loads supplied with power generated from the stack; a temperature estimating unit for estimating temperatures at the points where the concentration sensor is installed from the load amount measuring values; a concentration correcting unit for producing the corrected concentrations by applying the estimated temperatures to the sensing values of the concentration sensor; and a drive controller for controlling the drive of the fuel cell system according to the corrected concentrations.

Some embodiments provide a method for controlling a fuel cell system, the method comprising: measuring a load amount value on a stack; estimating a temperature at a concentration sensor from the load amount value; producing a corrected concentration value by correcting a concentration sensing value from the concentration sensor according to the estimated temperature; and controlling a drive of the fuel cell system according to the corrected concentration value.

In some embodiments, measuring the load amount value measures at least one of a voltage or current transmitted to the load.

In some embodiments, estimating the temperature comprises using a table comprising data of previous measurements relating temperature to load amount. In some embodiments, estimating the temperature comprises applying a linear or quadratic function using the load amount value as an input and the estimated temperature as an output.

In some embodiments, producing the corrected concentration value comprises using a table comprising temperature and corresponding corrected concentration values. In some embodiments, producing the corrected concentration value comprises using a table comprising temperature and concentration sensing values, and the corresponding corrected concentration values. In some embodiments, producing the corrected concentration value comprises applying a linear function or a quadratic function using the temperature and the concentration sensing value as inputs, and the corrected concentration value as an output.

Some embodiments provide a fuel cell system comprising: a stack configured for generating power by electrochemically reacting a fuel and an oxidant; a concentration sensor configured for measuring a concentration of an aqueous fuel solution supplied to the stack; a load amount measuring unit configured for measuring a load amount; a temperature estimating unit configured for estimating a temperature at the concentration sensor from the measured load amount value; a concentration correcting unit configured for producing a corrected concentration value by applying the estimated temperature to the sensing values of the concentration sensor; and a drive controller for controlling the drive of the fuel cell system according to the corrected concentration.

Some embodiments further comprise a power converter configured for converting power generated from the stack and transferring it to the loads, wherein the load amount measuring unit is installed in at least one of a power transmission line from the stack to the power converter, a power transmission line from the power converter to the loads, and the power converter.

In some embodiments, the load amount measuring unit is configured for measuring voltage and/or current at the installed point.

In some embodiments, the temperature estimating unit includes a table comprising load amount values and corresponding estimated temperatures. In some embodiments, the temperature estimating unit is configured to apply a linear or quadratic function using load amount values as inputs and estimated temperatures as outputs.

In some embodiments, the concentration correcting unit includes a table comprising temperatures and corresponding corrected concentration values. In some embodiments, the concentration correcting unit includes a table comprising temperatures and concentration sensing values, and corresponding corrected concentrations. In some embodiments, the concentration correcting unit is configured to apply a linear function or a quadratic function using temperature and concentration sensing value as inputs, and the corrected concentration value as an output.

Some embodiments further comprise: a heat exchanger configured for condensing cathode effluent from the stack; a fuel tank; and a mixing tank configured for generating an aqueous fuel solution by mixing a high-concentration fuel source and condensed water, wherein the concentration sensor is installed in the mixing tank.

In some embodiments, the drive controller is configured to control at least one of the supply of fuel from the fuel tank to the mixing tank and the degree of condensation of the heat exchanger.

Some embodiments provide a direct methanol fuel cell system comprising: a fuel cell stack comprising an anode and a cathode; a fuel mixing system fluidly connected to the anode; a heat exchanger comprising a condenser, wherein an input of the heat exchanger is fluidly connected to the cathode and an output of the heat exchanger is fluidly connected to the fuel mixing system; a high-concentration fuel tank fluidly connected to the fuel mixing system; a fuel concentration sensor disposed in the fuel mixing system; a load amount measuring unit coupled to and configured for measuring an electrical load on the stack; a temperature estimating unit coupled to the load amount measuring unit and configured for estimating a temperature at the concentration sensor from the measured load amount value; a concentration correcting unit coupled to the temperature estimating unit and the fuel concentration sensor, configured for applying the estimated temperature at the concentration sensor to a concentration output of the concentration sensor; and a drive controller coupled to the concentration correcting unit, and configured to control at least one of an output of the high-concentration fuel tank and the heat exchanger, thereby controlling a concentration of fuel.

BRIEF DESCRIPTION OF THE DRAWINGS

These and/or other aspects and advantages will become apparent and more readily appreciated from the following description of the preferred embodiments, taken in conjunction with the accompanying drawings of which:

FIG. 2 is a flow chart showing a control method executed in the fuel cell system of FIG. 1.

DETAILED DESCRIPTION OF CERTAIN PREFERRED EMBODIMENTS

Figure 1:
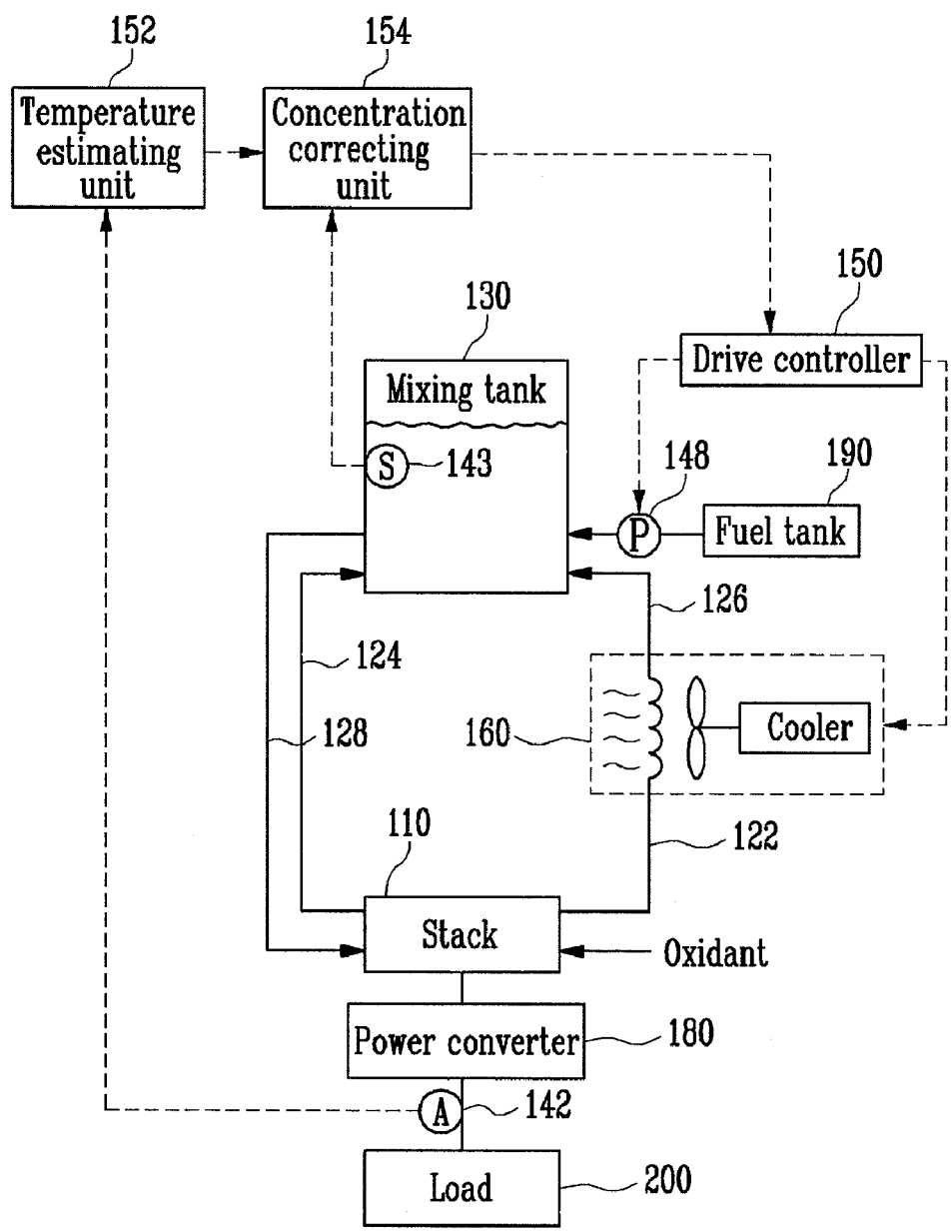
FIG. 1 is a structure diagram schematically showing an embodiment of a fuel cell system.

Hereinafter, preferable embodiments easily carried out by those skilled in the art will be described with reference to the accompanying drawings, which can be implemented in various forms and is thus not limited to the embodiments described in the specification.

Some embodiments provide a fuel cell system and method for driving the same. Direct methanol fuel cells use an aqueous methanol fuel and are most efficient at a particular fuel concentration. Fuel concentration sensors are temperature sensitive, however, so correcting the sensed concentration value to the temperature permits a more accurate concentration value. The system and method permit providing a temperature correction without using a temperature sensor.

Instead, the system monitors the load on the fuel cell stack and converts this value into a temperature, either using a table of known correlations, or analytically. The system then adjusts the fuel concentration as follows. The system includes a heat exchanger containing a condenser that condenses unreacted fuel and water discharged from the fuel cell stack. The output of the condenser is connected to a fuel mixing tank. The system also includes a high-concentration fuel tank containing a concentrated aqueous fuel source, which is also connected to the fuel mixing tank. If the system requires a higher concentration fuel, the high-concentration fuel tank is opened and/or the output of the condenser is reduced. The opposite occurs if a lower concentration fuel is required.

FIG. 1 shows a direct methanol fuel cell system including a mixing tank to which a concentration correcting means according to the embodiment can be applied.

As shown in FIG. 1, a direct methanol fuel cell includes: a stack 110 configured for generating electricity by electrochemically reacting a fuel such as hydrogen gas with an oxidant such as oxygen; a fuel tank 190 configured for storing a high concentration of fuel intended to supply to the stack 110; an oxidant supplier (not shown; generally implemented by a simple vent hole) configured for supplying an oxidant to the stack 110; a heat exchanger 160 configured for recovering unreacted fuel discharged from the stack 110; and a mixing tank 130 configured for supplying the hydrogen containing fuel to the stack 100, the hydrogen containing fuel being a mixture of the unreacted fuel discharged from the heat exchanger 160 and the high concentration fuel from the fuel tank 190. The power generated in the stack 110 is stabilized to a required voltage level by a power converter 180 and is then supplied to an external load 200.

Furthermore, in some embodiments comprise a unit configured for measuring the load on the power generated from the stack, for example, an ammeter 142 connected in parallel to a power transfer line from the power converter to the load 200 and a concentration sensor 143 for measuring the concentration of the mixed fuel.

Also, some embodiments comprise: a temperature estimating unit 152 configured for estimating a temperature of the mixing tank 130 from the measured current values of the ammeter 142; a concentration correcting unit 154 configured for producing the corrected concentrations by applying the estimated temperatures to the sensing values of the concentration sensor; a drive controller 150 configured for controlling the heat exchanger 160 and a pump 148 on a path from the fuel tank to the mixing tank according to the corrected concentrations.

The stack 110 is provided with a plurality of single cells, each of which includes a membrane electrode assembly (MEA) comprising a polymer membrane, and a cathode electrode and an anode electrode provided on both sides of the polymer membrane. The anode electrode reforms the hydrogen containing fuel supplied from the mixing tank 130 and oxidizes the generated hydrogen gas, thereby generating hydrogen ions ($H^+$) and electrons ($e^-$). The cathode electrode converts oxygen in the air supplied from the oxidant supplier into oxygen ions and electrons. The conductive polymer electrolyte membrane may be from about 50 μm to 200 μm thick, the conductive polymer electrolyte membrane preventing the transmission of the hydrogen containing fuel, together with exchanging the hydrogen ions generated from the polymer membrane anode electrode to the cathode electrode.

The voltage and current of the electric energy generated from the chemical reaction of hydrogen gas and oxygen in each single cell is converted to a standard output by the power converter 180, which is then output to the external load 200. According to the illustrated implementation, the output of the power converter 180 may be used to charge a separately provided secondary battery and/or to supply the power for the drive controller 150.

The cathode effluent comprising a mixed gas of carbon dioxide ($CO_2$), water ($H_2O$), and unreacted fuel is transferred to a condenser in the heat exchanger 160 through an outlet, and the unreacted fuel condensed in the condenser is collected in the mixing tank 130. The carbon dioxide contained in the non-reactive fuel can be discharged from the mixing tank 130 to the external environment. The unreacted fuel collected in the mixing tank 130 and the high concentration of fuel supplied from the fuel tank 190 are mixed and then supplied to the anode electrode.

The oxidant supplier may supply air as an oxidant, and can be implemented by an active driving pump for supplying air to the cathode electrode of the stack 110 or a passive vent hole with a structure for simply smoothing the flow of air.

The drive controller 150 controls the operation of the driving pump 148 for the fuel tank 190 based on the sensing values of the concentration sensor according to the embodiment and the operation of the heat exchanger 160. Also, according to the implementation, it controls the operation of the pump (not shown) supplying the fuel in the mixing tank 130 to the stack 110 or can be installed in a conduit 122 from the cathode to the heat exchanger 160, a conduit 126 from the heat exchanger 160 to the mixing tank 130, and a conduit 124 from the anode to the mixing tank 130, etc., according to the implementation, wherein the drive controller 150 can control the operations of the respective pump/valve installed.

The input data used for allowing the drive controller 150 to control the operations of the pumps include the fuel concentrations for each of the portions of the fuel cell, the generated power of the power converter (current, voltage, etc.), and the temperatures of each of the portions, etc.

The drive controller 150 increases the condensed amount of the unreacted fuel or the supply of raw material from the fuel tank 190 by increasing the rate of operation of the heat exchanger 160 if the concentration in the mixing tank 130 is lower than a predetermined reference value, while it reduces the condensed amount of the non-reactive fuel or the supply of raw material from the fuel tank 190 by reducing the rate of operation of the heat exchanger 160 if the concentration in the mixing tank 130 is higher than a predetermined reference. As a result, the efficiency of electric power generation of the fuel cell system can stably be maintained by constantly keeping the concentration of the hydrogen-containing fuel supplied from the mixing tank 130 to the anode electrode of the stack.

In the embodiment shown, since the concentration of the mixed fuel supplied to the stack 110 is determined in the mixing tank 130, it is preferable that the concentration sensor 143 is installed at the position where it is submerged into a diluted fuel in the mixing tank 130 as shown; however the concentration sensor 143 can also be installed inside other system components such as each of the conduits, the pump, etc., in addition to the mixing tank 130, according to the implementation. In particular, it can be installed in the conduits 128 from the mixing tank 130 to the stack 110.

Other conduits, such as the conduit 122 from the cathode to the heat exchanger 160, the conduit 126 from the heat exchanger 160 to the mixing tank 130, the conduit 124 from the anode to the mixing tank 130, and a conduit from the fuel tank 190 to the mixing tank 130, etc., can be provided with additional concentration sensors according to the implementation in order to achieve other purposes.

Since the temperature estimating unit 152, the concentration correcting unit 154, and the drive controller 150 perform less complex operations, it is preferable that they are not implemented as a separate hardware, but as a software module executed by one hardware component.

The concentration correcting unit 154 produces the corrected concentrations by compensating for the concentration sensing values input from the concentration sensor 143 according to the temperature of the stack. In the illustrated embodiment, the temperature estimating unit 152 does not directly measure the temperature of the stack, but predicts the temperature from the load (current in the drawings) on the stack.

The drive controller 150 controls the drive of the fuel cell system according to the corrected concentrations. In particular, the drive controller 150 controls the amount of fuel pumped from the fuel tank 190 into the mixing tank 130 and controls the condensed amount of the cathode effluent by the heat exchanger 160, in order to provide an actual fuel concentration similar to the ideal concentration.

A series of processes from the measurement of the concentration sensing values to the drive control of the fuel cell system will be described below as follows.

The control method of the fuel cell system includes the steps of: measuring (S120) the load amount on the stack; estimating (S140) the temperature where the concentration sensor is installed from the measured load amount values; producing (S160) the corrected concentrations by correcting the concentration sensing values according to the estimated temperature; and controlling (S180) the drive of the fuel cell system according to the corrected concentration.

FIG. 2 shows an embodiment of a control processes based on the case using current as the measured load amount supplied from the fuel cell system, including the mixing tank 130 and the heat exchanger 160 of FIG. 1 to the loads.

The step (S120) of measuring the load amount can measure voltage or current, or voltage and current so as to obtain power. In general, the load apparatus demands constant voltage input so that the power converter is implemented to maintain constant voltage output. Consequently, the current is generally measured as in FIG. 2.

In the step (S120) of measuring the load amount, the point where a means, for example, an ammeter, for sensing voltage and/or current may be a transmission line of the power converter in the stack, a point in the power converter, and a transmission line from the power converter to the load. In a double stack, for a case of the transmission line of the power converter, the measurement of both of the voltage and current may be required.

The step (S140) of estimating the temperatures estimates the temperature of the stack according to the measured load amount. Specifically, the relation of the temperatures and the load amount may use a table consisting of data obtained according to one or more previous measurements, and/or may be represented by a predetermined function using the load amount as input values and the temperatures as output values. Herein, the predetermined function may have a linear or quadratic function forms using the load amount values as inputs and the estimated temperatures as outputs.

According to the experiments of the present applicant, the relation of the estimated temperatures and the load amount can be simplified to a linear function form as in the following Equation 1. In the following Equation, constants $\alpha$ and $\beta$ may have different values from each other according to type of the fuel cell system and may be obtained by the measurement.

$$\text{Estimated temperature} = (\alpha \times \text{load power}) + \beta \quad \text{Equation 1}$$

As other methods, when measuring only current of the transmission line to the load, if the current increases, the electric power generation of the stack increases, which raises the temperature so that the temperatures determined by the measured current values may have a linear function and the current values have a quadratic function. At this time, the constants or coefficients of the functions may be different according the sorts of the stack or the internal structure of the fuel cell system.

The step (S160) of producing the corrected concentrations obtains the corrected concentrations by correcting the sensing values of the methanol concentration sensor according to the temperature of the stack (as the temperatures of the mixing tank). For correcting concentrations, a table comprising the temperatures and the corresponding corrected concentration values, or a table comprising the temperatures and the concentration sensing values and the corresponding corrected concentrations may be used. Also, corrected concentration values can be obtained by using a linear function or a quadratic function using the temperatures and the concentration sensing values as inputs and the corrected concentrations as outputs.

The deviations of the concentration sensing values according to the temperatures are given on the basis of each concentration sensor product. The more concrete process correcting the concentration sensing values according to the temperatures is performed by any suitable method known in the art.

In the embodiments, the step (S140) of estimating the temperatures provides the temperatures of the stack. In the step, since the stack and the mixing tank are maintained at a constant distance and a space between the stack and the mixing tank functions as a heat conductor with predetermined, fixed conductivity, there is not a large error when estimating the temperatures of the mixing tank from the temperatures of the stack. However, predetermined offset values considering the distance and the conductivity of the space should be given.

When the corrected concentrations are obtained according to the series of processes, the drive controller 160 of FIG. 1 controls the pumps/valves or the heat exchanger (S180), in order to control the amount of condensed water or high-concentration fuel flowed into the mixing tank. As described above, the supply of fuel from the fuel tank 190 to the mixing tank 130 is controlled and/or the degree of condensation of the heat exchanger 160 is controlled, in order to provide a substantially constant concentration of the mixed fuel in the mixing tank using the measured concentration of the mixing tank. The more concrete process of controlling the supply of the fuel using the pumps or valves or controlling of the amount of condensation of the heat exchanger is performed by any suitable method known in the art.

As described above, the present embodiments do not directly control the fuel concentration in the mixing tank from the concentration sensing values and the load amount that are first measured values, but further estimates the temperature of the mixing tank and corrects the concentration sensing values. Because of the advantages of constantly keeping the concentrations of the mixed fuel in the mixing tank within a range of concentrations as described above, the system and method are improved without modifying a relatively accurate known technology.

In order words, in the embodiments, the new process estimates the temperatures of the mixing tank from the load amount of the loads, making it possible to improve the accuracy of the concentrations measured by the concentration sensor without adding further components, and the process other than the process of estimating the temperatures of the mixing tank uses methods known in the art, making it possible to conveniently implement the control method of the entire fuel cell system.

Embodiments of the fuel cell system as described above are capable of correcting concentration sensing values without a separate temperature sensor, thereby ensuring a relatively accurate operation of the fuel cell system at low cost and small volume.

Although a few embodiments have been shown and described, it would be appreciated by those skilled in the art that changes might be made in these embodiments without departing from the principles and spirit of the disclosure, the scope of which is defined in the claims and their equivalents.

What is claimed is:

1. A fuel cell system comprising:
   a stack that generates power by electrochemically reacting a fuel and an oxidant;
   a fuel mixing location that provides mixed fuel and oxidant to the stack;
   a concentration sensor positioned within the fuel mixing location that measures a concentration of an aqueous fuel solution supplied to the stack;
   a load amount measuring unit that measures a load amount on the stack;
   a temperature estimating unit that is programmed to estimate a temperature at the concentration sensor in the fuel mixing location from the measured load amount value;
   a concentration correcting unit that is programmed to produce a corrected concentration value by applying the estimated temperature to the sensing values of the concentration sensor; and
   a drive controller that is programmed to drive the fuel cell system according to the corrected concentration.

2. The fuel cell system as claimed in claim 1,
   further comprising a power converter that converts power generated from the stack and transfers it to the loads,
   wherein the load amount measuring unit is installed in at least one of a power transmission line from the stack to the power converter, a power transmission line from the power converter to the loads, and the power converter.

3. The fuel cell system as claimed in claim 2, wherein the load amount measuring unit measures voltage and/or current at the installed point.

4. The fuel cell system as claimed in claim 1, wherein the temperature estimating unit includes a table comprising load amount values and corresponding estimated temperatures.

5. The fuel cell system as claimed in claim 1, wherein the temperature estimating unit is programmed to apply a linear or quadratic function using load amount values as inputs and estimated temperatures as outputs.

6. The fuel cell system as claimed in claim 1, wherein the concentration correcting unit includes a table comprising temperatures and corresponding corrected concentration values.

7. The fuel cell system as claimed in claim 1, wherein the concentration correcting unit includes a table comprising temperatures and concentration sensing values, and corresponding corrected concentrations.

8. The fuel cell system as claimed in claim 1, wherein the concentration correcting unit is programmed to apply a linear function or a quadratic function using temperature and concentration sensing value as inputs, and the corrected concentration value as an output.

9. The fuel cell system as claimed in claim 1, further comprising:
   a heat exchanger configured for condensing cathode effluent from the stack;
   a fuel tank; and
   a mixing tank configured for generating an aqueous fuel solution by mixing a high-concentration fuel source and condensed water,
   wherein the concentration sensor is installed in the mixing tank.

10. The fuel cell system as claimed in claim 9, wherein the drive controller is programmed to control at least one of the supply of fuel from the fuel tank to the mixing tank and the degree of condensation of the heat exchanger.

11. A direct methanol fuel cell system comprising:
    a fuel cell stack comprising an anode and a cathode;
    a fuel mixing system fluidly connected to the anode that provides mixed fuel to the fuel cell stack;
    a heat exchanger comprising a condenser, wherein an input of the heat exchanger is fluidly connected to the cathode and an output of the heat exchanger is fluidly connected to the fuel mixing system;
    a high-concentration fuel tank fluidly connected to the fuel mixing system;
    a fuel concentration sensor disposed in the fuel mixing system;
    a load amount measuring unit coupled to and configured for measuring an electrical load on the stack;
    a temperature estimating unit coupled to the load amount measuring unit and that is programmed to estimate a temperature at the concentration sensor from the measured load amount value;
    a concentration correcting unit coupled to the temperature estimating unit and the fuel concentration sensor, that is programmed to apply the estimated temperature at the concentration sensor to a concentration output of the concentration sensor; and
    a drive controller coupled to the concentration correcting unit, that is programmed to control at least one of an output of the high-concentration fuel tank and the heat exchanger, thereby controlling a concentration of fuel.

* * * * *